Nov. 28, 1961  E. D. CLARK  3,010,734
TRAILER TONGUE
Filed March 31, 1958
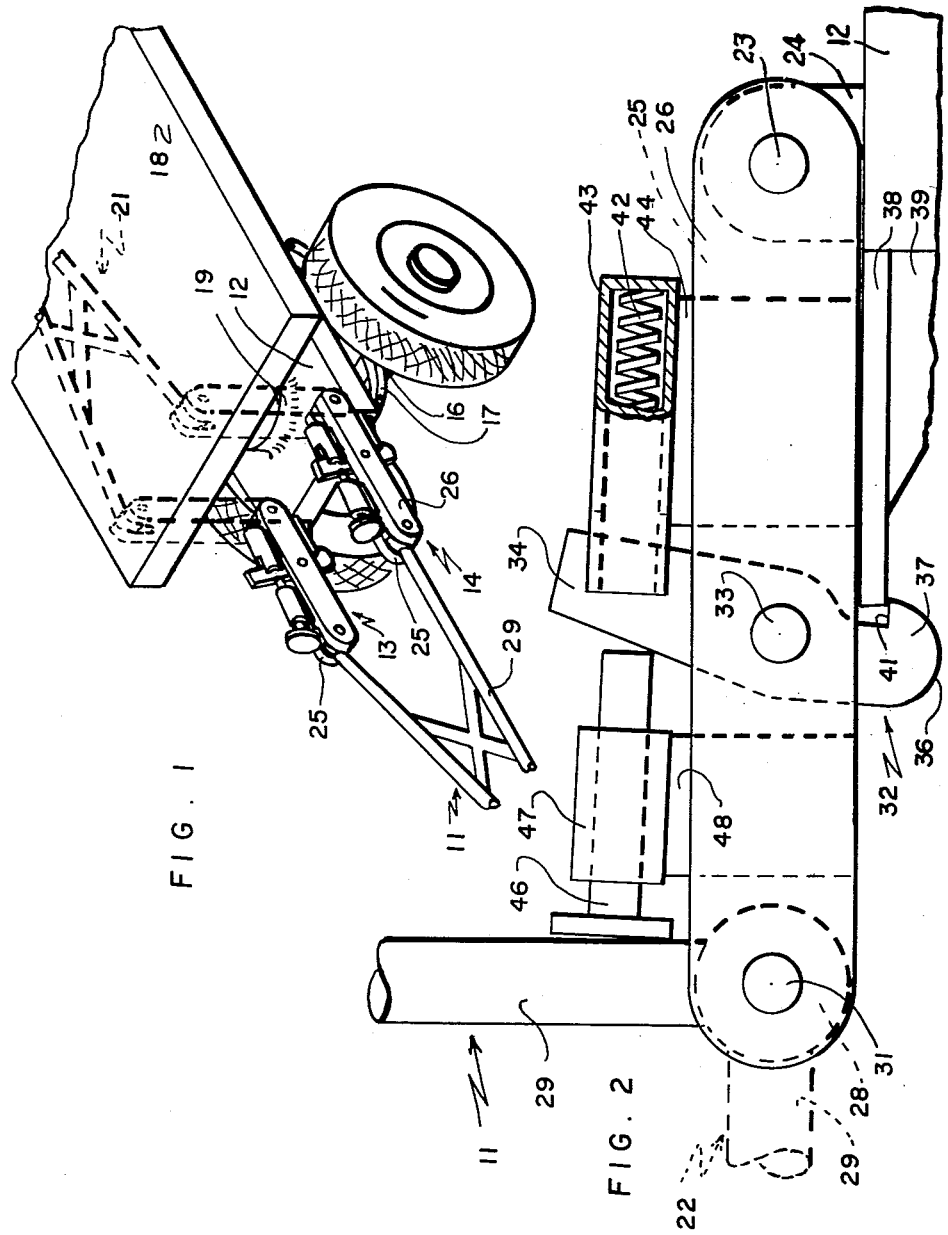
INVENTOR.
EARL D. CLARK
BY *Paul Bleven*
ATTORNEY

United States Patent Office 3,010,734
Patented Nov. 28, 1961

3,010,734
TRAILER TONGUE
Earl D. Clark, Willits, Calif.
(Covelo, Calif.)
Filed Mar. 31, 1958, Ser. No. 725,005
5 Claims. (Cl. 280—116)

The present invention relates to the construction of trailer tongues, and in more particular to a trailer tongue that will fold and lie back on the bed of its trailer.

There are many times when the tongue of a trailer is in the way of some operation. It is often desirable to be able to load a trailer on a truck bed, but often in such a loading, the tongue of the trailer prevents this. If the tongue of the trailer is removed therefrom, that is an added operation, and then the removed tongue must be stowed. The tongue cannot be swung back to lie on the trailer bed because the bed is, in most constructions, above the tongue pivot.

Having in mind the aforementioned needs, it is an object of the present invention to devise a trailer tongue that can be swung up and back to lie on the bed of its trailer.

Another object of the invention is to devise a trailer tongue that will fold.

Another object is to devise a trailer tongue that will fold automatically when it is swung upward.

A still further object of the invention is the devising of locking means of a foldable trailer tongue, which locking means will prevent folding of the trailer tongue except when it is swung upward toward its folded position.

These needs are satisfied and these objects achieved by a tongue construction in which one or more links are pivoted to and between the turntable of a trailer and the trailer tongue. These links are of a length so as to extend between the turntable and the upper face of the trailer bed so that the tongue may lie on and parallel to the bed. Locking means are provided for holding the link or links in forward position, or extension, parallel to the plane of the turntable, when the tongue is in towing position or is functioning to tow the trailer, and for automatically releasing from such locked position for upward extension when the tongue is swung upward.

The construction outlined above is hereinafter described in detail and illustrated in the accompanying drawings, in which:

FIGURE 1 is an isometric view of portions of a trailer and its tongue and the mechanisms of the present invention which associate such tongue and trailer.

FIGURE 2 is an elevational view enlarged over that of FIGURE 1 so as to show the details of the link between the trailer and its tongue.

FIGURE 1 is a perspective view of the front portion of a trailer and a portion of its tongue 11 attached to the turntable plate 12 of the trailer by means of a pair of links 13, 14 forming the subject of the present invention. Below the turntable 12 is the front axle 16 of the trailer, which axle is secured to the turntable plate by a pair of leaf springs, one at each side of the table, only one of the springs 17 being shown. The turntable pivotally supports thereabove the bed 18 of the trailer, but the details of such pivot means are not shown in detail other than as indicated by the mating pivot bosses 19, one of which is integral with the turntable plate and the other of which is integral with the trailer bed. FIGURE 1 embodies a dotted line showing 21 of the links 13, 14 and the tongue 11 after they have been folded up and back so that the tongue lies on and parallel to the bed of the trailer. The full line showing of FIGURE 1 of the tongue and links is of the tongue extended forward of the trailer in towing position for towing the trailer; and the links 13, 14 are, also, extended forward in towing position and are locked in such position by means hereinafter described.

FIGURE 2 is a side elevational view of one of the tongue connecting links, say of the near link 14, and the view is on a larger scale than that of FIGURE 1. Also, in this figure, the portion of the tongue shown is shown in full lines in a raised position where it is about to release the link 14 from its locked towing position 22, and the dotted line position 22 of the tongue is its towing position. In FIGURE 2, the tongue is swung upwardly from its dotted line position 22 to the full line position to effect release of the links from their locked towing position.

In FIGURE 1, the links 13, 14 are shown spaced apart across the front edge of the turntable plate 12. Each link is pivoted to the plate by a pin 23 passing through the rear, or plate, end of the link and thru an ear 24 which is integral with the plate and extends upward therefrom. The two pins 23 are in axial alignment and parallel to the axle 16 of the trailer. Each of the links is, in effect, composed of two parallel, spaced apart, and opposed bars 25, 26. At the rear, or plate, end of each link and between the bars is the plate boss 24, and at the tongue end, the front, or forward end, and between the bars is an eye 28 of which there is one integral with the rear end of each side rail 29 of the tongue 11. The eye 28 and the tongue rail 29 pivot on a tongue pin 31 which passes thru the tongue eye and the bars. Located centrally of and between the bars is a hook 32 which is free to swing on a pivot 33 which passes transversely thru the hook and the bars. The hook is actuated for pivotal movement by its upper arm portion 34 and by the rounded edge 36 of its lower portion, its beak, or hook portion 37, when such edge engages the top edge of a holddown shelf 38 which is secured to the forward edge of the turntable plate 12, and which forms an extension of the top surface thereof. A gusset 39 between the front edge of the plate and below the shelf, braces the shelf to the plate. The lip 41 of the hook 32 engages below the holddown shelf 38 to lock the link in its towing position. A spring 42 engages against the rear edge of the hook arm 34 of the hook to urge the hook into engagement with the holddown shelf. This spring is secured in a socket 43 which is integral with a spring socket block 44 secured between and integral with the link bars 25, 26 to properly space them apart. The forward end of the socket is bifurcated to receive and guide therebetween a portion of the hook arm 34. The forward edge of the hook arm 34 is contacted by the rear end of a plunger 46 having limited longitudinal movement in a sleeve 47 which is integral with a plunger sleeve block 48 secured between and integral with the link bars 25, 26 to properly space them apart.

The forward end of the plunger 46 is in position to be contacted by the rail 29 of the tongue 11 when it is swung upward as shown in full lines in FIGURE 2. The rail will force the plunger 46 rearward against the hook arm 34 to compress the spring 42 and to swing the hook on its pivot 33. This causes the hook to disengage from the holddown shelf 38 so that the link may swing upward on its pivot pin 23. FIGURE 2 shows the hook almost disengaged from the holddown shelf. When the tongue is swung down into towing position, the link will, also, swing down into towing position. This will bring the rounded edge 36 of the beak end of the hook into engagement with the edge of the holddown shelf, force the hook to rotate its beak end from the shelf, and then as the link comes to rest on the shelf the hook lip 41 will engage under the shelf, from the urging of the spring 42, to lock the link in towing position. The above operations of laying the tongue back on the trailer bed and of taking the tongue off the trailer bed and swinging it and the connecting link forward into towing position, may be done easily by one man. There is no removing of tongue pins such as the pivot pins 31, and then the job of stowing a loose tongue. In the use of the present invention, swinging the tongue rearward automatically unlocks the tongue connecting links 13, 14 so that they may swing upward when the tongue contacts the trailer bed so that the tongue may lie on and parallel to the bed. When the tongue lies on the trailer bed, it is a simple operation to secure the tongue to the trailer.

The links 13, 14 may be longer than shown in the drawings so that when the tongue lies on and parallel to the bed, the links will be at an acute angle to the bed and to the tongue. This will allow for variations in the distance between the turntable plate 12 and the upper surface of the trailer bed 18. Each of the links may be made in one piece, that is, the bars 25, 26, and the blocks 44, 48 between the bars may be formed from one piece of metal by slotting the ends and the midportion of the piece to receive the plate ear 24, the tongue eye 28 and the hook 32 in their appropriate places.

Of course, the towing position of the tongue 11 is not a fixed position as the tongue swings up and down about its pins 31. The extent that the tongue may swing without releasing the connecting links 13, 14 is a matter of design and may vary within wide limits according to the desires of the designer or user of the equipment. Also, the connecting links 13, 14 need not be parallel to the turntable plate 12 or the bed 18 of the trailer. The usual criteria is that the line of pull of the tongue be as low as possible. The need is that the links swing from locked position upward so that the tongue will lie on the bed as above described.

Having thus described my invention, its construction and operation, I claim:

1. The combination of a trailer tongue; a tongue connecting link; a trailer turntable; means pivotally connecting said tongue and link, and said link and turntable; said means allowing said tongue, link, and turntable to have pivotal movement with respect to each other; said link being formed medially thereof with a slot therethru; a hook in said slot; a pivot connecting said hook to said link and providing said hook with pivotal movement with respect to said link; said hook being provided with a lip and an operating arm; a shelf attached to said turntable and engageable by said hook lip whereby upon such engagement of lip and shelf pivotal movement of said link with respect to said turntable is prevented; a spring biasing said hook to such engagement of lip and shelf; and means intermediate said tongue and hook operating arm whereby movement of said tongue will, thru said last named means, actuate said arm for disengagement of said hook lip and shelf.

2. A trailer turntable, a link, means pivotally securing one end of said link to said turntable, a tongue, means pivotally securing one end of said tongue to the other end of said link, locking means between said turntable and said link whereby said link and turntable may be locked together to prevent pivotal movement of said link with respect to said turntable, and release means located between said tongue and said locking means whereby movement of said tongue with respect to said link will cause said release means to actuate said locking means to release said link for pivotal movement with respect to said turntable.

3. A trailer turntable, a link, means pivotally securing one end of said link to said turntable, a tongue, means pivotally securing one end of said tongue to the other end of said link, locking means between said turntable and said link whereby said link and turntable may be locked together with said link substantially horizontal to prevent upward pivotal movement of said link with respect to said turntable and whereby pivotal movement upward of said tongue with respect to said link will cause said link to be free for pivotal movement with respect to said turntable.

4. A trailer turntable having a forward edge, a link, means pivotally securing one end of said link to the upper face of said turntable and removed from said edge, means away from said link end for selectively securing said link to lie on said turntable, a tongue pivoted to the other end of said link, said means for securing including a latching lever engageable between said link and turntable, and an element between said lever and said tongue whereby when said tongue is pivoted upward with respect to said link and turntable it will engage said element to operate said lever to release said link from lying on said turntable.

5. A trailer turntable having a forward edge; a trailer bed supported on, above, and spaced from said turntable; a link; removed from said edge, means pivotally securing one end of said link to the upper face of said turntable; means away from said link end for selectively securing said link to said turntable to prevent pivotal movement of said link; a tongue pivoted to the other end of said link; said link being of a length to extend between said turntable and said bed so that said tongue may lie on said bed; said means for securing including a latching lever engageable between said link and turntable; and an element between said lever and said tongue whereby when said tongue is pivoted upward with respect to said link and turntable it will engage said element to operate said lever to release said link for pivotal movement.

References Cited in the file of this patent
UNITED STATES PATENTS

| 355,192 | Merrill et al. | Dec. 28, 1886 |
| 576,746 | Spangler | Feb. 9, 1897 |
| 809,913 | Ferris | Jan. 9, 1906 |
| 1,523,355 | Gleason | Jan. 13, 1925 |
| 1,802,400 | Benson | Apr. 28, 1931 |

FOREIGN PATENTS

| 224,093 | Switzerland | Jan. 18, 1943 |